(12) United States Patent
Keuper et al.

(10) Patent No.: US 7,212,344 B2
(45) Date of Patent: May 1, 2007

(54) ILLUMINATION SYSTEM WITH ALIGNED LEDS

(75) Inventors: Matthijs H. Keuper, San Jose, CA (US); Gerard Harbers, Sunnyvale, CA (US)

(73) Assignee: Philips Lumileds Lighting Company, LLC, San Jose, CA (US)

( * ) Notice: Subject to any disclaimer, the term of this patent is extended or adjusted under 35 U.S.C. 154(b) by 122 days.

(21) Appl. No.: 10/789,834

(22) Filed: Feb. 27, 2004

(65) Prior Publication Data

US 2005/0190562 A1     Sep. 1, 2005

(51) Int. Cl.
*G02B 27/10* (2006.01)
*G02B 27/14* (2006.01)
*G03B 21/00* (2006.01)

(52) U.S. Cl. .................... 359/618; 359/638; 353/33
(58) Field of Classification Search ............... 359/618, 359/629, 634, 636, 638–640; 353/31, 33, 353/34, 81, 82
See application file for complete search history.

(56) References Cited

U.S. PATENT DOCUMENTS

| | | | | |
|---|---|---|---|---|
| 6,019,474 A | * | 2/2000 | Doany et al. | 353/81 |
| 6,540,377 B1 | | 4/2003 | Ota et al. | 362/231 |
| 6,552,754 B1 | * | 4/2003 | Song et al. | 353/31 |
| 6,648,475 B1 | * | 11/2003 | Roddy et al. | 353/31 |
| 2005/0018285 A1 | * | 1/2005 | Kubota et al. | 359/443 |
| 2005/0128441 A1 | * | 6/2005 | Morgan | 353/31 |

OTHER PUBLICATIONS

G. Harbers, M. Keuper, S. Paolini, "High Power LED illuminator for Data and Video Projection", Proceedings of The 9th international Display Workshops, Hiroshima, Japan, pp. 501-504 (2002).
G. Harbers, M. Keuper, S. Paolini, "Performance of High-Power LED Illuminators in Projection Displays", MicroDisplay 2002, Digest of Papers, Westminster, Colorado, USA, pp. 22-25 (2002).
M. Keuper, G. Harbers, S. Paolini, "Ultra-compact LED based Image Projector for Portable Applications", SID Internation Symposium, Techn. Digest of Papers, pp. 713-715 (2003).

* cited by examiner

*Primary Examiner*—Alicia M Harrington
(74) *Attorney, Agent, or Firm*—Patent Law Group LLP

(57) ABSTRACT

A compact illumination system that is suitable for, e.g., projection systems, includes a plurality of light emitting diodes that are aligned along the same axis. The illumination system includes mirrors and a filter system for combining the light emitted by the different light emitting diodes. The light emitting diodes may be mounted within the same plane, e.g., on the same heatsink, which simplifies assembly and alignment of the system. Moreover, a collimator system with integrally formed refractive and/or reflective collimators, may be used. The use of an integrally formed collimator system advantageously reduces the number of piece parts and simplifies assembly.

30 Claims, 3 Drawing Sheets

ILLUMINATION SYSTEM WITH ALIGNED LEDS

FIELD OF THE INVENTION

The present invention relates to an illumination architecture that uses multiple light emitting diodes, and in particular to combining the light from multiple colored light emitting diodes.

BACKGROUND

Display illumination devices, such as micro display projectors, use separate components of light, e.g., red, green, and blue components, and combine the separate components at the display. For example, in some display systems, light from a white high intensity discharge lamp is split into red, green, and blue channels using, e.g., dichroic mirrors, and the separate channels are sent to the corresponding display by the use of a mirror system. Alternatively, a color wheel is used to obtain the desired red, green, and blue components, from the white light, and the display is synchronized with the illuminator color. Starting from white light, however, is disadvantageous as such systems are typically bulky and inefficient.

Some display systems use high powered light emitting diodes (LEDs) that emit red, green and blue light. Generally, however, display illumination devices that combine the colored light emitted from separate light emitting diodes are bulky and require many piece parts. Thus, assembly is time consuming and prone to alignment error.

Accordingly, what is needed is an improved illumination device, e.g., that can be formed with a small footprint with a minimal number of piece parts.

SUMMARY

In accordance with an embodiment of the present invention, a compact illumination system that is suitable for, e.g., projection systems, includes a plurality of light emitting diodes that are aligned along the same axis. The illumination system includes mirrors and a filter system that is disposed between the mirrors. The combination of mirrors and filter system combine the light emitted by the different light emitting diodes while retaining a small footprint. The light emitting diodes may be mounted within the same plane, e.g., on the same heatsink, which simplifies assembly and alignment of the system. Moreover, a collimator system with integrally formed collimators may be used, which reduces the number of piece parts and also simplifies assembly.

In one aspect of the present invention, an apparatus includes a first light emitting diode, a second light emitting diode and a third light emitting diode, each of which is aligned in the same approximate direction. The apparatus includes a first reflecting surface positioned to reflect light emitted from the first light emitting diode and a second reflecting surface positioned to reflect light emitted from the second light emitting diode. The apparatus includes a first filter disposed between the first reflecting surface and the second reflecting surface. The first filter is configured to reflect the light reflected from the first reflecting surface and to transmit light reflected from the second reflecting surface and the light emitted by the third light emitting diode. The apparatus also includes a second filter disposed between the first reflecting surface and the second reflecting surface and configured to reflect the light reflected from the second reflecting surface and to transmit light reflected from the first reflecting surface and the light emitted by the third light emitting diode. The first filter and second filter combine the light reflected from the first reflecting surface, the light reflected from the second reflecting surface and the light emitted from the third light emitting diode.

In another aspect of the present invention, an apparatus includes a plurality of light emitting diodes positioned along the same plane, each light emitting diode emitting light aligned in the same direction. The apparatus includes a first reflecting surface positioned to reflect light emitted from a first light emitting diode and a second reflecting surface positioned to reflect light emitted from a second light emitting diode. A first filter is configured to reflect the light emitted from the first light emitting diode after being reflected from the first reflecting surface and being configured to transmit light that is emitted from the third light emitting diode. A second filter is configured to reflect the light emitted from the second light emitting diode after being reflected from the second reflecting surface and being configured to transmit light that is emitted from the third light emitting diode. The first filter and second filter combine the light emitted by the first light emitting diode, second light emitting diode and third light emitting diode.

In another aspect of the present invention, a method includes providing a frame and mounting a collimator system to the frame, the collimator system including at least three collimators. The method further includes mounting a first mirror and a second mirror to the frame, the first mirror positioned to reflect light condensed by a first collimator and the second mirror positioned to reflect light condensed by a second collimator. A filter system is also mounted to the frame. The filter system is positioned to combine the light condensed by a third collimator with the light reflected by the first mirror and the light reflected by the second mirror. Additionally, a heatsink having at least three light emitting diodes is mounted to the frame such that each of the light emitting diodes is aligned with an associated collimator lens.

DETAILED DESCRIPTION

An illumination system, in accordance with an embodiment of the present invention, uses a number of separate LEDs that are aligned along the same axis and includes a compact lens and filter system that combines the light from the LEDs in a small footprint. Moreover, the LEDs may be mounted on the same heatsink. Accordingly, the assembly and alignment of the illumination system is straightforward, which reduces costs and error.

Figure 1:
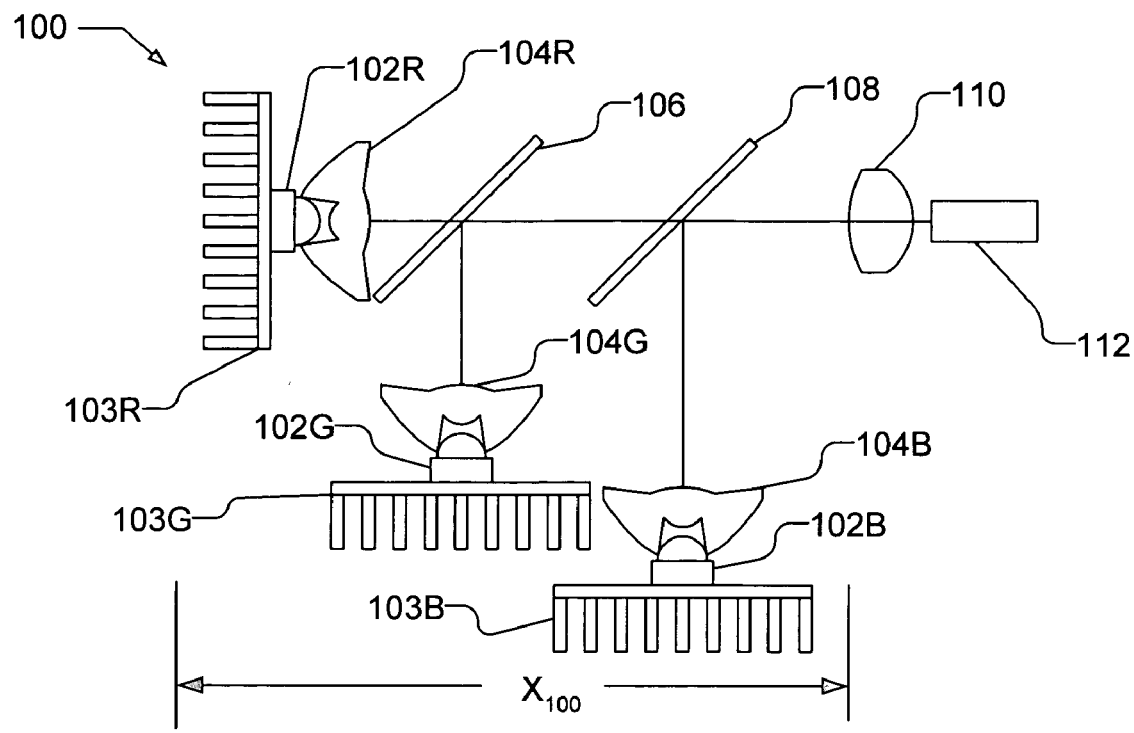
FIG. 1 illustrates one possible illumination system that combines the light from multiple colored LEDs.

FIG. 1 illustrates one possible illumination system 100 that combines the light from multiple colored LEDs with a condenser lens 110. The condenser lens 110 focuses the combined light onto a homogenizer or integrator rod 112, which may be located externally to system 100. System 100 includes a red LED 102R, a green LED 102G and a blue LEG 102B (collectively referred to herein as LEDs 102). The light emitted from each LED 102R, 102G, and 102B is collimated by an associated collimator lens 104R, 104G, and 104B, respectively (collectively referred to herein as collimators 104).

The system 100 includes dichroic filters 106 and 108. Filter 106 is transparent to red light and reflects green light, while filter 108 is transparent to both red and green light, but reflects blue light. Thus, prior to being received by a condenser lens 110, red light emitted by LED 102R is passed through both filters 106 and 108, green light emitted by LED 102G is reflected by filter 106 and passed through filter 108, and blue light emitted by LED 102B is reflected by filter 108. Of course, if the order of LEDs is arranged differently, other combinations of filters may be used.

Because the LEDs 102 generate heat, and the efficiency of an LED is reduced with elevated temperatures, heatsinks 103R, 103G, and 103B (collectively referred to herein as heatsinks 103) are thermally coupled to LEDs 102R, 102G, and 102B, respectively. The use of heatsinks 103 maintains the temperature of the LEDs within an acceptable operating temperature, e.g., a junction temperature<120° C.

In a system where the LEDs 102 have the same chip sizes and the collimators 104 are the same for all the LEDs, the distance between the collimators 104 and the condenser lens 110 needs to by the same for all LEDs 102. Thus, the total size of the system 100, as represented by dimension $X_{100}$ in FIG. 1, is large, making system 100 unsuitable for small applications.

Additionally, as can be seen in FIG. 1, the LEDs 102 are mounted in three different planes and LED 102R is aligned with an orthogonal orientation relative to LEDs 102G and 102B. Thus, a separate heatsink 103 must be used for each LED and a separate collimator lens is associated with each LED. Each LED and associated heatsink 103, and collimator lens must be independently mounted and aligned in system 100. Thus, the system 100 includes a number of piece parts that must be accurately assembled and aligned in order for the system 100 to operate properly. Accordingly, the assembly of system 100 is cumbersome, time consuming, and prone to error.

Figure 2:
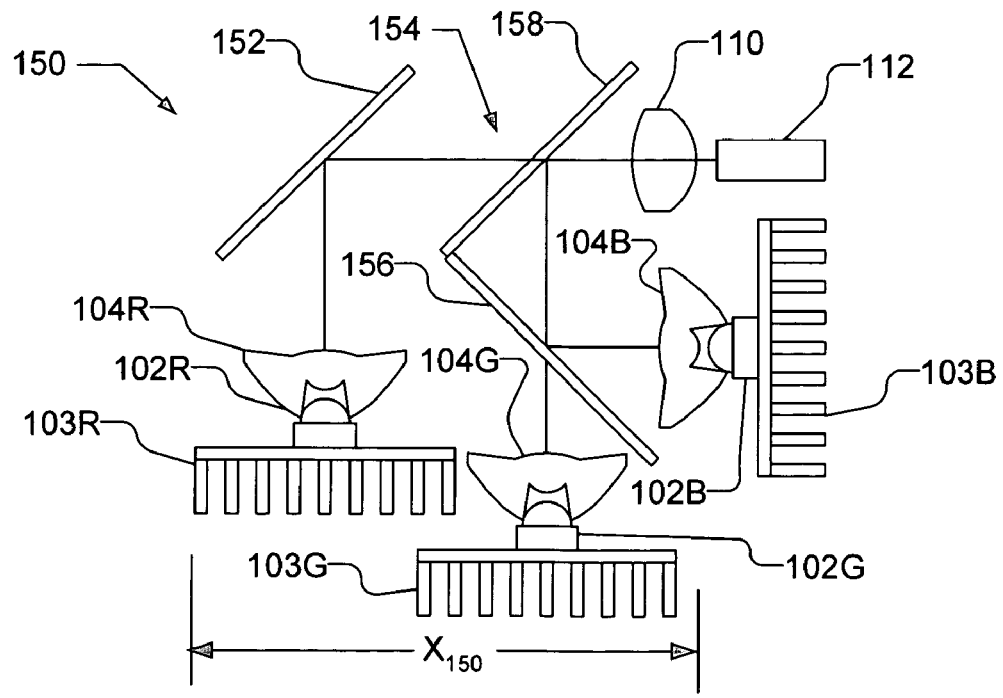
FIG. 2 illustrates another illumination system.

FIG. 2 illustrates another illumination system 150, which is similar to system 100, like designated elements being the same. System 150, however, uses a mirror 152 that reflects the red light emitted by LED 102R toward the condenser lens 110. System 150 also uses a folding filter 154, which includes a first portion 156 that transmits green light emitted by LED 102G and reflects blue light emitted by LED 102B and a second portion 158 that transmits red light and reflects green and blue light.

The configuration illustrated in FIG. 2 is advantageous as the size, illustrated by dimension $X_{150}$, is reduced relative to the system 100 shown in FIG. 1. Nevertheless, system 150 includes the other disadvantageous of system 100, such as the need for separate heatsinks and the need to independently mount and align the LEDs 102, which is cumbersome, time consuming and prone to error.

Figure 3:
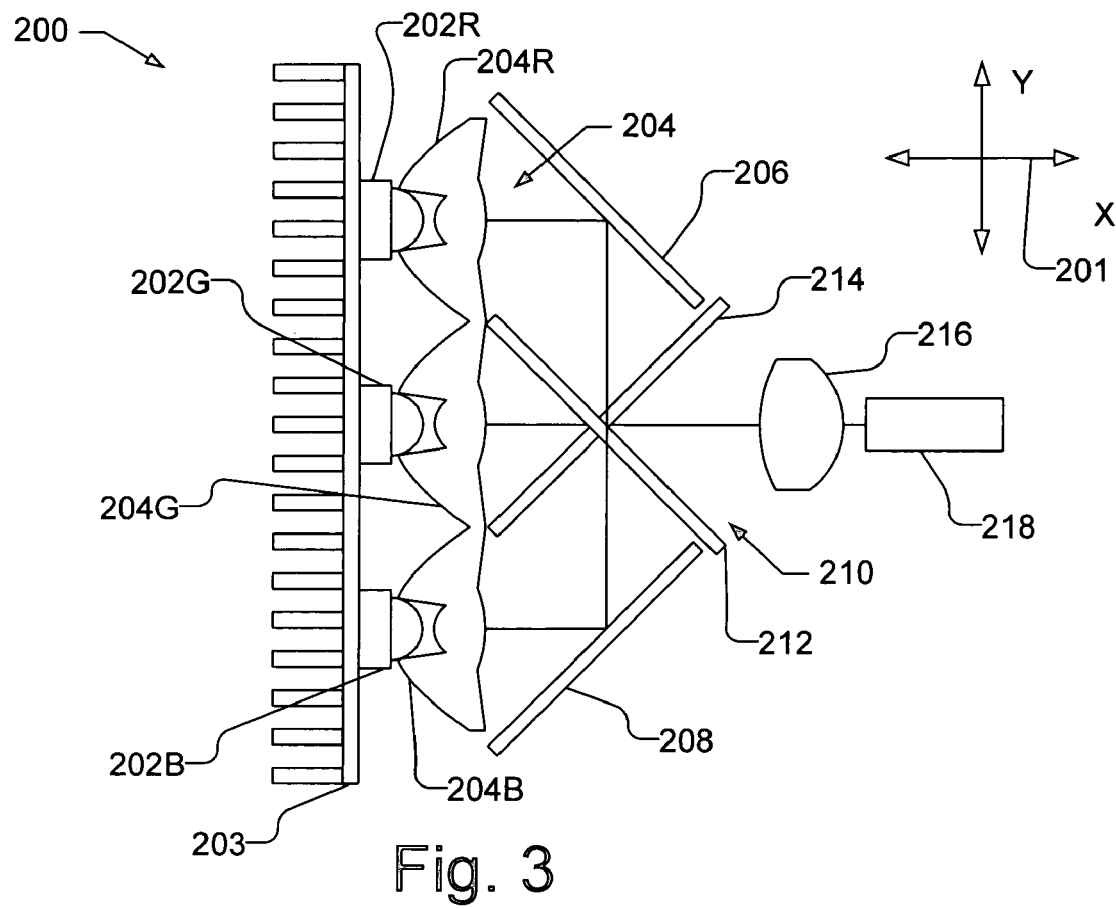
FIG. 3 illustrates an illumination system that includes multiple LEDs that are aligned in the same direction and mounted within the same plane.

FIG. 3 illustrates an illumination system 200 that includes multiple LEDs 202 that may be different colored, e.g., red, green and blue (individually referred to as LEDs 202R, 202G, and 202B). The LEDs 202 are aligned along the same axis (e.g., the X axis 201) so that the LEDs 202 emit light in the same general direction. In other words, the surface normal for the LEDs 202 are approximately parallel. The LEDs 202 may be any high powered LEDs, such as those described in U.S. Pat. Nos. 6,486,499 and 6,091,085 and in U.S. Ser. No. 10/782,248, entitled "Illumination System with LEDs", filed on Feb. 18, 2004 by Gerard Harbers, Matthijs H. Keuper and Daniel A. Steigerwald, which is assigned to the assignee of the present disclosure, all of which are incorporated herein by reference.

As illustrated in FIG. 3, the LEDs 202 may be mounted along the same plane, which advantageously permits mounting of each LED 202 on the same heatsink 203. The light produced by LEDs 202R, 202G, and 202B is collimated by an associated collimator lens 204R, 204G, and 204B, respectively. With the LEDs 202 arranged in a single plane, the collimator lenses can be combined into a collimator system 204, which may be, e.g., injection molded acrylic. The use of LEDs 202 arranged in a single plane and on a single heatsink 203 and an integrated collimator system 204 advantageously reduces the number of piece parts, cost and simplifies the mounting of the LEDs 202. Accordingly, assembly of system 200 is straightforward and has a reduced risk of misalignment.

The collimator system 204 modifies the radiation pattern of the LEDs to form narrower beams, which can then be reflected and/or filtered. The collimator system 204 may have any configuration include a single lens associated with each LED or a lens system associated with each LED. Moreover, the collimator system 204 may use refractive, reflective or a combination of refractive and reflective elements to modify the radiation pattern of the LEDs.

System 200 includes mirrors 206 and 208 that direct light from LEDs 202R and 202B, respectively, to a filter system 210 that is, e.g., disposed between mirrors 206 and 208. The mirrors 206, 208, and filter system 210 are configured to combine and direct the light from the LEDs 202 to a condenser lens 216. The filter system 210 may include two filters 212 and 214. The first filter 212 is a dichroic filter that reflects red light emitted by LED 202R and transmits green and blue light emitted by LEDs 202G and 202B, respectively. The second filter 214 is another dichroic filter that reflects blue light emitted by LED 202B and transmits red and green light emitted by LEDs 202R and 202G, respectively. One of either the first dichroic filter 212 or second dichroic filter 214 is split with the ends of the two split portions separated by and abutting the face and back of the other filter. It should be understood that filter system 210 may have other configurations. By way of example, filter system 210 may be one or more dichroic prism, such as an X-cube may be used if desired.

Thus, the light emitted by LEDs 202R and 202B are reflected by mirrors 206 and 208, respectively, and reflected by filter system 210 to the condenser lens 216, while the light emitted by LED 202G is transmitted directly through the filter system 210 to the condenser lens 216. The condenser lens 216 focuses the combined light onto a homogenizer or integrator rod 218, or other desired lens system, which may be located externally to system 200.

Of course, if the order of the LEDs 202 is arranged differently, other combinations of filters may be used.

Another advantage of system 200 is that the light paths from LEDs 202R and 202B are folded twice, i.e., first by mirrors 206 and 208, respectively, and second by filter system 210. Because the LED light path is folded twice, the length of the system 200 can be reduced with respect to system that only folds the light once, e.g., system 100 and 150. It should be understood that because the path from LED 102G to the condenser lens 216 is shorter than the path from either LED 102R and 102B to the condenser lens 216, the collimator lens 204G should be shaped differently than collimators 204R and 204G in order for the efficiencies to be the same. Thus, the use of a configuration of the mirrors and filters, such as shown in FIG. 3, along with the use of LEDs 202 arranged in a single plane and a single collimator system produces a compact illumination system.

Figure 4:
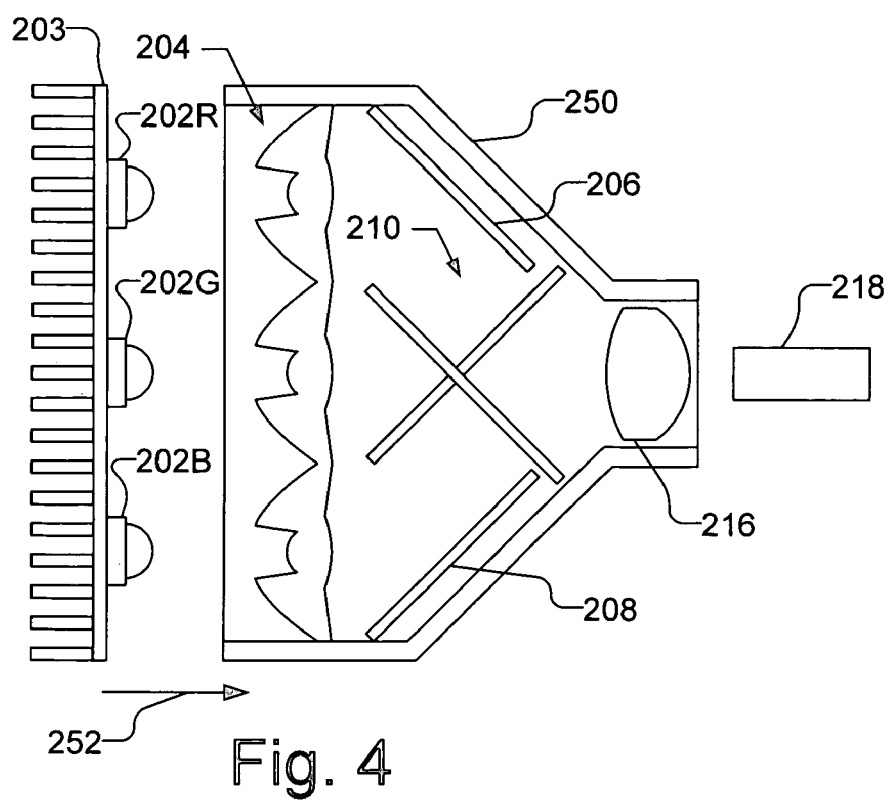
FIG. 4 illustrates a top plan view of the illumination system shown in FIG. 3 installed in a frame.

FIG. 4 illustrates a top plan view of system 200 installed in a frame 250 (the top portion of the frame is not shown). Frame 250, e.g., may be manufactured from machined metal or metal alloy, or from molded plastic or other similarly appropriate material. As illustrated in FIG. 4, the mirrors 206, 208, and filter system 210 are mounted in the frame 250. In one embodiment, the frame 250 may include slots or other guides in the bottom or along the sides that assist in positioning the components within frame 250. The top portion of the frame 250 (not shown) may include similar slots or guides to assist in properly positioning the components. The mirrors and filter system may be mounted in the frame 250 using, e.g., a glue or epoxy or by press fitting. The integrated collimator lens 204 is similarly mounted in the frame 250.

As illustrated by arrow 252 in FIG. 4, the LEDs 202R, 202G, and 202B, which are mounted on a single heatsink 203, can be easily and accurately mounted and properly aligned with collimator system 204, mirrors 206, 208, and filter system 210 by pressing the heatsink 203 against the frame 250 and affixing the heatsink 203 thereto, e.g., using screws, epoxy, retainer tabs or any other appropriate attaching means. Thus, as can be seen in FIG. 4, the installation and alignment of the system 200 is simplified with respect to systems 100 and 150.

Figure 5:
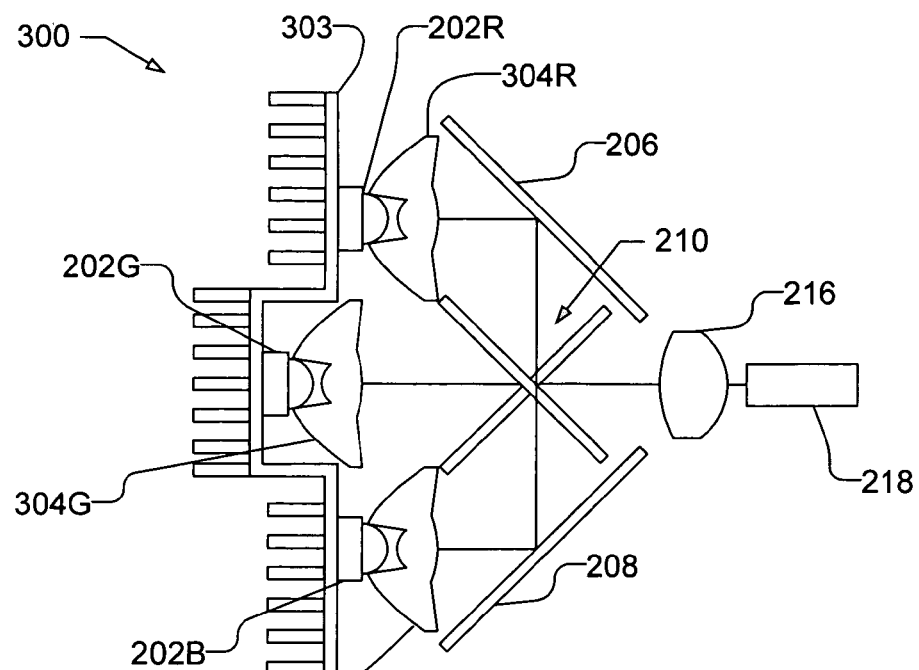
FIG. 5 illustrates an illumination system that includes multiple LEDs that are aligned in the same direction, but not mounted within the same plane.

FIG. 5 illustrates an illumination system 300 that is similar to system 200, like designated elements being the same. As illustrated in FIG. 5, the LEDs 202R, 202G, and 202B are aligned along the same axis but are not mounted within the same plane. The LEDs 202 are mounted on a single heatsink 303. The heatsink 303, however, is not planar. Because the LEDs 202 are aligned in the same direction, i.e., the surface normal of LEDs 202 is approximately parallel, the configuration of mirror 206, 208, and filter system 210 may be the same as shown in system 200. System 300 includes separate collimator lenses 304R, 304G, and 304B due to the offset position of LED 202G. The offset position of LED 202G, advantageously, increases the path length of the light from LED 202G to the condenser lens 216. Thus, in an embodiment in which the path length for light emitted from LED 202G is the same as the path length for light emitted from LEDs 202R or 202B, the collimator lenses 304R, 304G, and 304B may have the same shape.

Figure 6:
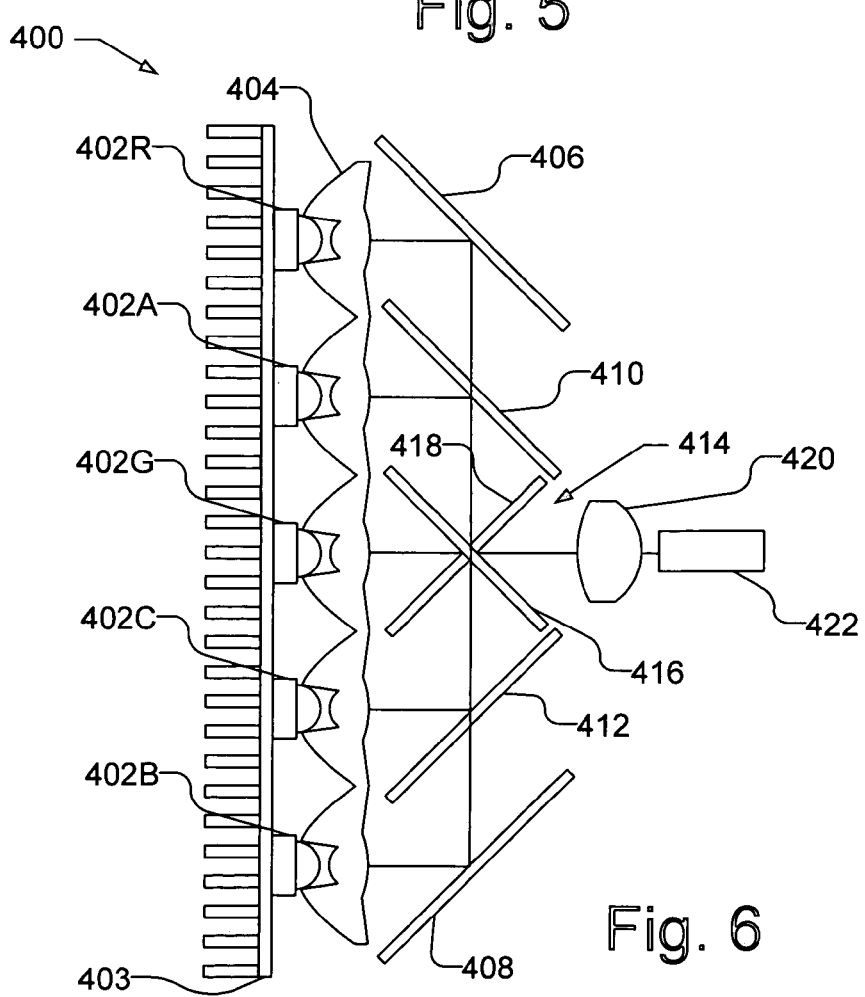
FIG. 6 illustrates an illumination system similar to that shown in FIG. 3 but with additional LEDs.

FIG. 6 illustrates another illumination system 400 that includes a plurality of different colored LEDs 402 that, similar to system 200, are mounted along the same plane. System 400 by way of example includes LEDs that produce red, amber, green, cyan, and blue, individually referred to as LEDs 402R, 402A, 402G, 402C, and 402B. The LEDs 402 may all be mounted on a single heatsink 403. Of course, if desired, more than one heatsink may be used, e.g., LEDs 402R and 402A may be mounted on one heatsink, while LEDs 402G, 402C, and 402B may be mounted on a different heatsink. Moreover, if desired, some LEDs 402 may be the same color, e.g., two LEDs may emit red light, two LEDs may emit green light, and one LED may emit blue light.

As with system 200, system 400 may include a combined collimator system 404, with one or more collimator lenses associated with each LED 402. The collimator system 404 may use refractive elements, reflective elements or a combination thereof. The system 400 further includes a double folded light path for the LEDs 402, except for the center LED 402G. Thus, system includes mirrors 406 and 408, which reflect light from LEDs 402R and 402B, respectively. Filters 410 and 412 reflect amber light and cyan light emitted from LEDs 402A and 402C, respectively, and transmit the red and blue light from LEDs 402R and 402B, respectively. The filter system 414 includes a filter 416 that is transparent to the light emitted by LEDs 402G, 402C and 402B and reflects the light emitted by LEDs 402R and 402A. Filter system 414 also includes a split filter 418 that is transparent to the light emitted by LEDs 402G, 402R and 402A and reflects the light emitted by LEDs 402C and 402B. Thus, the light from LEDs 402 is combined and incident on condenser lens 420, which focuses the combined light onto a homogenizer or integrator rod 422, or other desired lens system, which may be located externally to system 400.

Although the present invention is illustrated in connection with specific embodiments for instructional purposes, the present invention is not limited thereto. Various adaptations and modifications may be made without departing from the scope of the invention. For example, the description of the colors the order of the LEDs is exemplary and other colors, orders or duplicative colors may be used. Moreover, different types of LEDs may be used with the present invention. Therefore, the spirit and scope of the appended claims should not be limited to the foregoing description.

What is claimed is:

1. An apparatus comprising:
   a first light emitting diode, a second light emitting diode and a third light emitting diode;
   a first reflecting surface positioned to reflect light emitted from the first light emitting diode;
   a second reflecting surface positioned to reflect light emitted from the second light emitting diode;
   a first filter disposed between the first reflecting surface and the second reflecting surface and configured to reflect the light reflected from the first reflecting surface and to transmit light reflected from the second reflecting surface and the light emitted by the third light emitting diode;
   a second filter disposed between the first reflecting surface and the second reflecting surface and configured to reflect the light reflected from the second reflecting surface and to transmit light reflected from the first reflecting surface and the light emitted by the third light emitting diode, wherein the first filter and second filter are dichroic filters positioned orthogonally relative to one another, the first filter and second filter combine the light reflected from the first reflecting surface, the light reflected from the second reflecting surface and the light emitted from the third light emitting diode; and
   an optical integrator positioned to receive the combined light from the first filter and the second filter.

2. The apparatus of claim 1, wherein first filter has a front surface and a back surface, and wherein the second filter comprises two halves, a first half having an end that abuts the front surface of the first filter and the second half having an end that abuts the back surface of the first filter.

3. The apparatus of claim 1, the apparatus further comprising a lens configured to receive the combined light from the first filter and the second filter.

4. The apparatus of claim 1, wherein the first light emitting diode, second light emitting diode and third light emitting diode each emit light of a different color, the colors being red, green and blue.

5. The apparatus of claim 1, wherein the first light emitting diode, second light emitting diode and third light emitting diode lie within the same plane.

6. The apparatus of claim 1, the apparatus further comprising a heatsink, wherein the first light emitting diode, second light emitting diode, and third light emitting diode are mounted on the heatsink.

7. The apparatus of claim 1, wherein the optical integrator is an integrator rod positioned to receive the combined light from the first filter and the second filter.

8. An apparatus comprising:
a first light emitting diode, a second light emitting diode and a third light emitting diode;
a first reflecting surface positioned to reflect light emitted from the first light emitting diode;
a second reflecting surface positioned to reflect light emitted from the second light emitting diode;
a first filter disposed between the first reflecting surface and the second reflecting surface and configured to reflect the light reflected from the first reflecting surface and to transmit light reflected from the second reflecting surface and the light emitted by the third light emitting diode; and
a second filter disposed between the first reflecting surface and the second reflecting surface and configured to reflect the light reflected from the second reflecting surface and to transmit light reflected from the first reflecting surface and the light emitted by the third light emitting diode;
wherein the first filter and second filter combine the light reflected from the first reflecting surface, the light reflected from the second reflecting surface and the light emitted from the third light emitting diode;
a collimator system, the collimator system comprising:
a first collimator associated with the first light emitting diode, the first collimator collimating the light emitted by the first light emitting diode prior to reflecting from the first reflecting surface;
a second collimator associated with the second light emitting diode, the second collimator collimating the light emitted by the second light emitting diode prior to reflecting from the second reflecting surface; and
a third collimator associated with the third light emitting diode, the third collimator collimating the light emitted by the third light emitting diode prior to being transmitted through the first filter and the second filter.

9. The apparatus of claim 8, the apparatus further comprising:.
a frame holding the first reflecting surface, the second reflecting surface, the first filter and the second filter, and the collimator system;
a heatsink, the first light emitting diode, second light emitting diode, and third light emitting diode are mounted on the heatsink, the heatsink mounted to the frame.

10. The apparatus of claim 8, wherein the first filter and second filter are formed from an X-cube prism.

11. An apparatus comprising:
a first light emitting diode, a second light emitting diode and a third light emitting diode;
a first reflecting surface positioned to reflect light emitted from the first light emitting diode;
a second reflecting surface positioned to reflect light emitted from the second light emitting diode;
a first filter disposed between the first reflecting surface and the second reflecting surface and configured to reflect the light reflected from the first reflecting surface and to transmit light reflected from the second reflecting surface and the light emitted by the third light emitting diode; and
a second filter disposed between the first reflecting surface and the second reflecting surface and configured to reflect the light reflected from the second reflecting surface and to transmit light reflected from the first reflecting surface and the light emitted by the third light emitting diode;
wherein the first filter and second filter combine the light reflected from the first reflecting surface, the light reflected from the second reflecting surface and the light emitted from the third light emitting diode;
a fourth light emitting diode and a fifth light emitting diode that are aligned in the same approximate direction as the first light emitting diode, second light emitting diode, and third light emitting diode;
a third reflecting surface positioned to reflect light emitted from the fourth light emitting diode;
a fourth reflecting surface positioned to reflect light emitted from the fifth light emitting diode;
wherein the first filter is further configured to reflect the light reflected from the third reflecting surface and to transmit light reflected from the fourth reflecting surface, and the second filter is further configured to reflect the light reflected from the fourth reflecting surface and to transmit light reflected from the third reflecting surface, and wherein the first filter and second filter combine the light reflected from the first reflecting surface, the light reflected from the second reflecting surface, the light reflected from the third reflecting surface, the light from the fourth reflecting surface and the light emitted from the third light emitting diode.

12. The apparatus of claim 11, wherein the third reflecting surface is configured to transmit light reflected from the first reflecting surface and the fourth reflecting surface is configured to transmit light reflected from the second reflecting surface.

13. The apparatus of claim 11, wherein the first light emitting diode, second light emitting diode, third light emitting diode, fourth light emitting diode, and fifth light emitting diode each emit light of a different color, the colors being red, amber, green, cyan, and blue.

14. An apparatus comprising:
a plurality of light emitting diodes positioned along the same plane, each light emitting diode emitting light aligned in the same direction;
a first reflecting surface positioned to reflect light emitted from a first light emitting diode;
a second reflecting surface positioned to reflect light emitted from a second light emitting diode;
a first filter configured to reflect the light emitted from the first light emitting diode after being reflected from the first reflecting surface and being configured to transmit light that is emitted from the third light emitting diode;
a second filter configured to reflect the light emitted from the second light emitting diode after being reflected from the second reflecting surface and being configured to transmit light that is emitted from the third light emitting diode; wherein the first filter and second filter combine the light emitted by the first light emitting diode, second light emitting diode and third light emitting diode, wherein the first filter and second filter are dichroic filters positioned orthogonally relative to one another; and
an optical integrator positioned to receive the combined light from the first filter and the second filter.

15. The apparatus of claim 14, further comprising a lens configured to receive the combined light from the first filter and the second filter.

16. The apparatus of claim 15, the apparatus further comprising:
 a frame holding the first reflecting surface, the second reflecting surface, the first filter and the second filter, and the lens;
 a heatsink, the first light emitting diode, second light emitting diode, and third light emitting diode being mounted on the heatsink, the heatsink mounted to the frame.

17. The apparatus of claim 14, wherein the first filter and the second filter are disposed between the first reflecting surface and the second reflecting surface.

18. The apparatus of claim 14, wherein first filter has a front surface and a back surface; and wherein the second filter comprises two halves, a first half having an end that abuts the front surface of the first filter and the second half having an end that abuts the back surface of the first filter.

19. The apparatus of claim 14, wherein the first light emitting diode, second light emitting diode and third light emitting diode each emit light of a different color, the colors being red, green and blue.

20. The apparatus of claim 14, wherein the optical integrator is an integrator rod positioned to receive the combined light from the first filter and the second filter.

21. An apparatus comprising:
 a plurality of light emitting diodes positioned along the same plane, each light emitting diode emitting light aligned in the same direction;
 a first reflecting surface positioned to reflect light emitted from a first light emitting diode;
 a second reflecting surface positioned to reflect light emitted from a second light emitting diode;
 a first filter configured to reflect the light emitted from the first light emitting diode after being reflected from the first reflecting surface and being configured to transmit light that is emitted from the third light emitting diode;
 a second filter configured to reflect the light emitted from the second light emitting diode after being reflected from the second reflecting surface and being configured to transmit light that is emitted from the third light emitting diode; wherein the first filter and second filter combine the light emitted by the first light emitting diode, second light emitting diode and third light emitting diode;
 a frame holding the first reflecting surface, the second reflecting surface, the first filter and the second filter, and the lens;
 a heatsink, the first light emitting diode, second light emitting diode, and third light emitting diode being mounted on the heatsink, the heatsink mounted to the frame;
a collimator system comprising:
 a first collimator associated with the first light emitting diode;
 a second collimator associated with the second light emitting diode; and
 a third collimator associated with the third light emitting diode;
 wherein the frame further holds the collimator lens system.

22. The apparatus of claim 21, wherein the first filter and second filter are formed from an X-cube prism.

23. A method comprising:
 providing a frame;
 mounting a collimator system to the frame, the collimator system including at least three collimators;
 mounting a first mirror and a second mirror to the frame, the first mirror positioned to reflect light condensed by a first collimator and the second mirror positioned to reflect light condensed by a second collimator;
 mounting a filter system to the frame, the filter system positioned to combine the light condensed by a third collimator with the light reflected by the first mirror and the light reflected by the second mirror; and
 mounting a heatsink having at least three light emitting diodes to the frame, wherein mounting the heatsink aligns each of the light emitting diodes with an associated collimator in the collimator system.

24. The method of claim 23, further comprising mounting the at least three light emitting diodes on the heatsink.

25. The method of claim 23, wherein mounting a filter system to the frame comprises:
 mounting a first dichroic filter to the frame; and
 mounting second dichroic filter to the frame, the second dichroic filter having a first portion mounted on a first side of the first dichroic filter and a second portion mounted on a second side of the first dichroic filter such that the first dichroic filter and the second dichroic filter are oriented orthogonally to each other.

26. The method of claim 23, wherein mounting a filter system to the frame comprises mounting an X-cube prism to the frame.

27. The method of claim 23, further comprising mounting a condenser lens to the frame, the condenser lens positioned to receive the light combined by the filter system.

28. The method of claim 23, wherein the at least three collimators are lenses. integrally formed within the collimator system.

29. The method of claim 23, wherein a plurality of the light emitting diodes emit different colored light, the colors being red, green and blue.

30. An apparatus comprising:
 a first light emitting diode, a second light emitting diode and a third light emitting diode;
 a heatsink, the first light emitting diode, second light emitting diode, and third light emitting diode mounted on the heatsink;
 a first collimator associated with the first light emitting diode, the first collimator collimating the light emitted by the first light emitting diode
 a first reflecting surface positioned to reflect light emitted from the first light emitting diode and collimated by the first collimator;
 a second collimator associated with the second light emitting diode, the second collimator collimating the light emitted by the second light emitting diode;
 a second reflecting surface positioned to reflect light emitted from the second light emitting diode and collimated by the second collimator;
 a third collimator associated with the third light emitting diode, the third collimator collimating the light emitted by the third light emitting diode;
 a first filter disposed between the first reflecting surface and the second reflecting surface and configured to reflect the light reflected from the first reflecting surface and to transmit light reflected from the second reflecting surface and the light emitted by the third light emitting diode and collimated by the third collimator; and a second filter disposed between the first reflecting surface and the second reflecting surface and configured to reflect the light reflected from the second reflecting surface and to transmit light reflected from the first reflecting surface and the light emitted by the third light emitting diode and collimated by the third collimator, wherein the first filter and second filter combine the light reflected from the first reflecting surface, the light reflected from the second reflecting surface and the light emitted from the third light emitting diode and collimated by the third collimator.

* * * * *